2,869,996
LIQUID FERTILIZER

Donald E. Vierling, Pittsburgh, Pa.

No Drawing. Application October 2, 1956
Serial No. 613,372

2 Claims. (Cl. 71—29)

This invention relates to compositions of matter intended to assist plant growth, and more particularly to liquid fertilizers.

It is, of course, well known that nitrogen (N), phosphorous expressed as phosphorus pentoxide ($P_2O_5$), and potassium expressed as potassium oxide ($K_2O$) are nutrients to plant life, and such have, for many years, been widely used in dry fertilizers. While these dry fertilizers have been of some value in the trade, they have not been entirely satisfactory. For example, recent surveys have shown that most users of fertilizers much prefer that it be furnished to them in liquid form, thereby eliminating any necessity for their having to make up solutions from solid particulate form with its attendant disadvantages. Further, in many cases, it is desired to introduce the fertilizer through the leaves of the plant. This, however, cannot be done properly and effectively with dry fertilizers, for they are effective generally only by root feeding.

It is, accordingly, one of the objectives of the present invention to provide an improved fertilizer in liquid form, and particularly one which is completely effective for leaf feeding, as well as root feeding, pre-plow and general fertilization.

Another object is to provide a liquid fertilizer having the foregoing advantages, and which is also characterized by being absorbed by the plants in a tremendously increased manner, thereby practically eliminating any possibility of leaching, evaporation or any other form of loss. Accordingly, the plant is, to all intents and purposes, able to utilize substantially the complete value of the nutrients present in the improved liquid fertilizer of the present invention.

In preparing the liquid fertilizer of this invention, I first place in a vessel in which the fertilizer is to be made the amount of water which is to be present in the final composition. To the water is added potassium hydroxide to obtain the desired percentage of potassium oxide in the final composition. Phosphoric acid is then added to obtain the desired percentage of phosphorus pentoxide in the final composition. The phosphoric acid is neutralized by adding aqueous ammonia, or by bubbling anhydrous ammonia into the solution. To this neutral solution, urea is added to obtain the desired nitrogen content.

While the liquid fertilizer obtained at this point is an excellent one, particularly for root feeding, pre-plow and general fertilization, the preferred embodiment of the present invention contemplates the addition thereto of a wetting agent, particularly for leaf feeding, as will be discussed hereinafter. While any of the standard wetting agents, anionic as well as nonionic, will be satisfactory for purposes of this invention, provided they are not detrimental to plant life, I have found the following wetting agents to be particularly effective: Ultra-Wet, Santomerse, Naconal, Oronite D-40, Triton X-100, Triethanolamine, Super Wet LD, Dupanol, dodecyl benzene sodium sulfonate, lauryl alcohol and algin. If desired, trace elements, similar to the following may be added to the liquid fertilizer to supply various soil deficiencies: boric acid, copper sulphate, zinc sulphate, cobalt sulphate, iron sulphate, sodium molybdate and manganese sulphate.

The composition of matter obtained from the procedure generally outlined above comprising the following salts:

1. Potassium phosphate, dibasic ($K_2HPO_4$)
2. Potassium phosphate, tribasic ($K_3PO_4$)
3. Ammonium phosphate, dibasic (($NH_4)_2HPO_4$)
4. Ammonium phosphate, monobasic ($NH_4H_2PO_4$)
5. Potassium phosphate, monobasic ($KH_2PO_4$)
6. Ammonium phosphate, metabasic (($NH_4)_4P_4O_{12}$)
7. Potassium ammonium phosphate ($KNH_4HPO_4$)

the organic compound

1. Urea ($CO(NH_2)_2$)

the acid:

1. Phosphoric acid ($H_3PO_4$)

the following bases:

1. Potassium hydroxide (KOH)
2. Ammonium hydroxide ($NH_4OH$)

and the following ions:

1. $H^+$
2. $PO_4^{---}$
3. $K^+$
4. $OH^-$
5. $NH_4^+$

The amounts of the various chemicals present can acceptably vary over a wide range and depend, in part, on such variables as temperature, pressure, the desired ratio of nitrogen, phosphorus pentoxide and potassium oxide desired in the final liquid fertilizer, etc. For best results, however, I have found that nitrogen should be about one to about 45% by weight of the final liquid fertilizer, phosphorus pentoxide about one to about 45% by weight, and potassium oxide about one to about 45% by weight. The wetting agent, when added in accordance with the preferred embodiment of the present invention, should be present in an amount corresponding to at least about 0.25% by weight, preferably about 0.5 to about 1.0% by weight of the final composition.

Illustrative specific composition

Into a vat was placed 18½ pounds of water. While stirring, and at room temperature, 72° and atmospheric pressure, the following ingredients were added successively thereto: 13¼ pounds of 90% aqueous potassium hydroxide; 36¾ pounds of 75% phosphoric acid; 20¼ pounds of 29.4% aqueous ammonia; and 11⅓ pounds of urea. The entire procedure took about fifteen minutes. The solution obtained was suitable as a liquid fertilizer in accordance with my invention.

The following chemicals (expressed as percent by weight of the final composition) were found to be present:

| | Percent |
|---|---|
| 1. $K_2HPO_4$ | 12.1 |
| 2. $K_3PO_4$ | 4.3 |
| 3. $(NH_4)_2HPO_4$ | 11.3 |
| 4. $NH_4H_2PO_4$ | 9.7 |
| 5. $KH_2PO_4$ | 1.2 |
| 6. $(NH_4)_4P_4O_{12}$ | 0.7 |
| 7. $KNH_4HPO_4$ | 0.12 |
| 8. $CO(NH_2)_2$ | 13.0 |
| 9. $H_3PO_4$ | 0.6 |
| 10. KOH | 0.2 |
| 11. $NH_4OH$ | 0.6 |

In addition, the ions $H^+$, $PO_4^{---}$, $K^+$, $OH^-$ and $NH_4^+$ will be present and in equilibrium with the chemicals set forth at the given temperature, pressure, concentration and other physical factors. The foregoing specific composition contained 10% by weight nitrogen, 20% by weight phosphorus pentoxide, and 10% by weight potassium oxide.

As previously stated, while such a composition is excellent as a liquid fertilizer, the preferred embodiment of the present invention contemplates the addition thereto of a relatively small amount of a wetting agent in order to assist entry of the fertilizer into the leaf of the plant being treated. It is a well-known fact that nitrogen in an aqueous solution is readily absorbed by a plant through its leaves. However, in the case of phosphorus and potassium in an aqueous solution, it is exceedingly difficult to get these nutrients into the plant through the leaves in sufficient quantities to properly feed the plant. This has been a big drawback until now in getting each of these nutrients in plant life by leaf feeding. Thus, attempts in the past in this direction have resulted in the plant getting all of the nitrogen, but very insufficient amounts of phosphorus and potassium. Most of the phosphorus and potassium crystallized on the plant leaves and was subsequently removed from the leaves by the natural elements of wind and moisture. This, of course, meant that the plant received an unbalanced feeding of nutrients. I have found that, when a wetting agent is added to an aqueous solution of nitrogen, phosphorus and potassium such as described above, a synergistic effect takes place and all of the hereinbefore defined nutrients are readily absorbed by the plant through the leaves and a completely balanced feeding of the plant results.

*Example of specific usage*

Ten pepper plants were sprayed with an aqueous solution of a liquid fertilizer described in the aforementioned illustrative specific composition, the same containing 10 grams of nitrogen, 20 grams of phosphorus pentoxide, and 10 grams of potassium oxide. It was found that the plants absorbed 9.5 grams of nitrogen, and only 0.0135 gram of phosphorus pentoxide and 0.0041 gram of potassium oxide. One-half percent by weight of Santomerse (dodecyl benzene sodium sulfonate) was added to the same composition. In the identical procedure, the solution was sprayed on ten similar pepper plants. The plants absorbed 9.9 grams of nitrogen, 19.7 grams of phosphorus pentoxide, and 9.6 grams of potassium oxide. Accordingly, substantially all of the nutrients were absorbed by the plants when the wetting agent was employed.

Further tests showed that a wetting agent, such as those previously described, is absolutely necessary in order to enable the plant to absorb all of the nutrients in quantities sufficient for leaf feeding.

While the above example shows that the addition of a wetting agent makes the composition superior for leaf feeding, the composition without the wetting agent is unexcelled for root feeding, pre-plow and general fertilization, as mentioned earlier herein.

The liquid fertilizer of the present invention has been found to serve as a very effective vehicle for additional water soluble chemicals generally used in agriculture, such as weed killers, soil conditioners, sequestering agents, vitamins, penicillin, antibiotics, etc.

In hard water areas, some difficulty with the solubility of certain of the agricultural chemicals might be expected. However, I have found that, along with the wetting agent, and preferably in equal proportions therewith to obtain the aforementioned total percentages, any one of the well-known sequestering agents (for example of the polyphosphate variety) not only improves solubility, but actually aids in improved biological activity.

This application is a continuation-in-part of my patent application Serial Number 449,247, filed August 11, 1954, now Patent No. 2,770,538, and entitled "Liquid Fertilizer."

Obviously, many modifications and variations of the invention, as defined above, can be made without departing from the spirit and scope thereof, and, therefore, only such limitations should be imposed as are indicated in the appended claims.

I claim:

1. A substantially complete aqueous solution for assisting plant growth consisting essentially of the acid $H_3PO_4$; the bases KOH and $NH_4OH$; the salts $K_2HPO_4$, $K_3PO_4$, $(NH_4)_2HPO_4$, $NH_4H_2PO_4$, $KH_2PO_4$, $(NH_4)_4P_4O_{12}$ and $KNH_4PO_4$; and the organic chemical $CO(NH_2)_2$; said acid, bases, salts and organic chemical being present in amounts corresponding to the equilibrium ratio as established by the nitrogen, phosphorus pentoxide and potassium oxide content, whereby the resultant solution contains the ions $H^+$, $PO_4^{---}$, $K^+$, $OH^-$ and $NH_4^+$ in equilibrium with said acid, bases salts and organic chemical at a selected temperature and pressure, the nitrogen (N), phosphorous pentoxide ($P_2O_5$) and potassium oxide ($K_2O$) each being present in amounts ranging between approximately 1% and approximately 45% by weight.

2. The composition of claim 1 containing additionally a wetting agent.

References Cited in the file of this patent

UNITED STATES PATENTS

| | | |
|---|---|---|
| 1,950,068 | Spangenberg | Mar. 6, 1934 |
| 2,022,673 | Kniskern | Dec. 3, 1935 |
| 2,314,091 | Jones | Mar. 16, 1943 |
| 2,350,982 | Borst | June 13, 1944 |